Sept. 14, 1965 R. ALTSON 3,206,263
CAGE FOR ANTIFRICTION BEARINGS
Filed Oct. 12, 1962
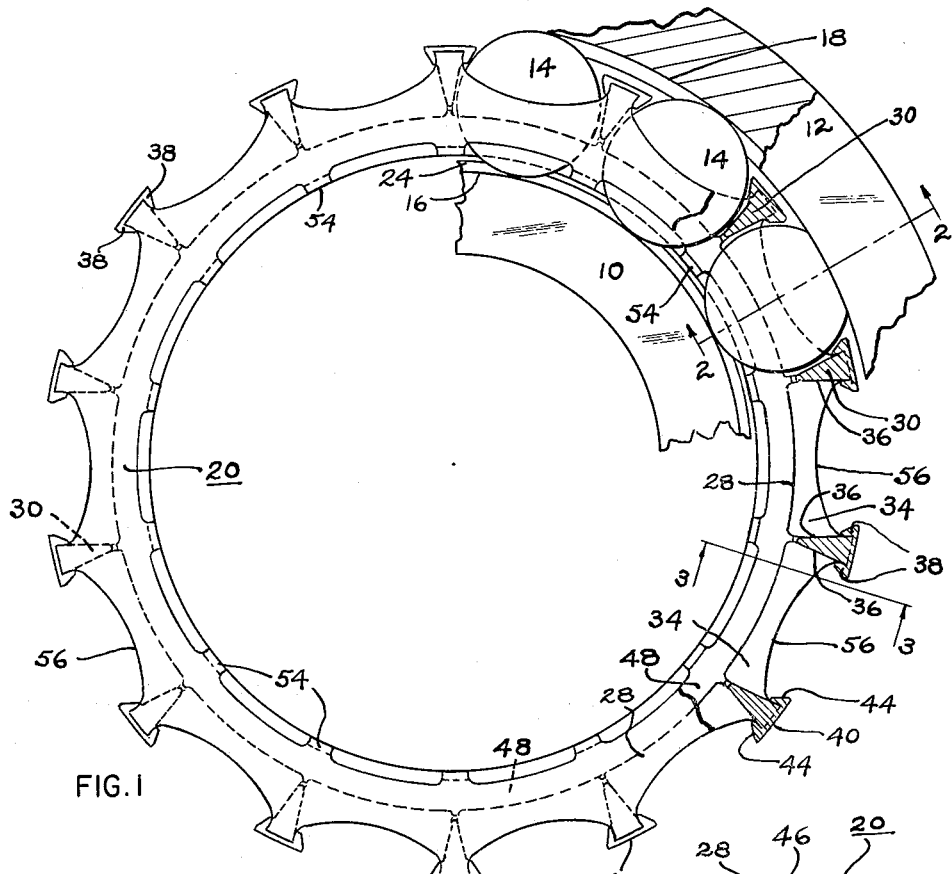
FIG. 1
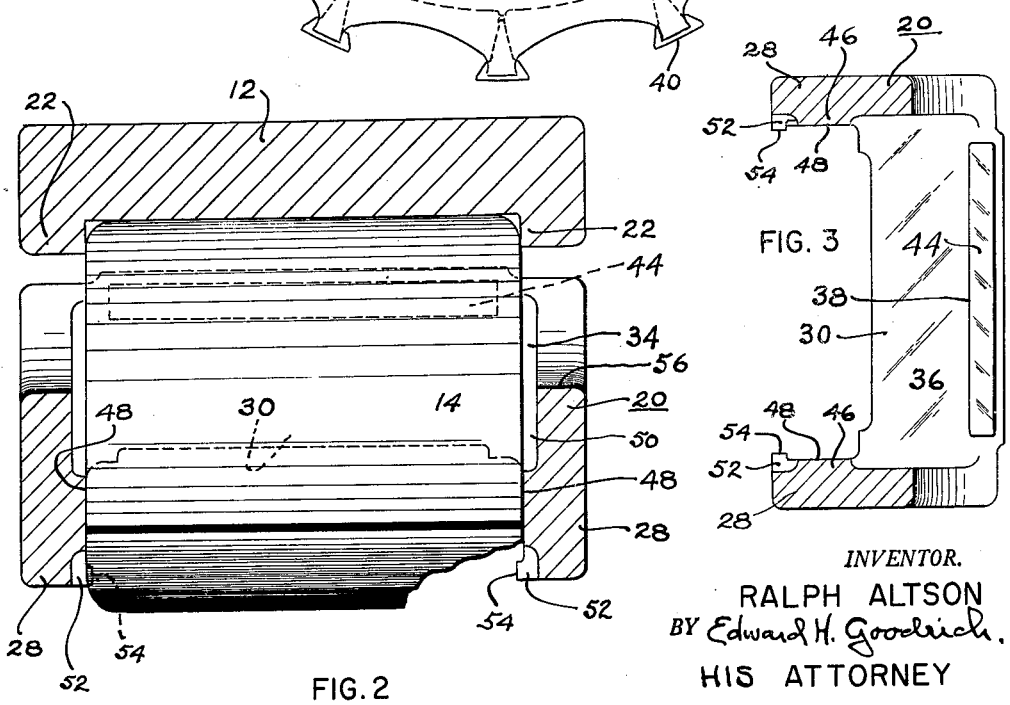
FIG. 2
FIG. 3
INVENTOR.
RALPH ALTSON
BY Edward H. Goodrich
HIS ATTORNEY United States Patent Office 3,206,263
Patented Sept. 14, 1965

3,206,263
CAGE FOR ANTIFRICTION BEARINGS
Ralph Altson, Summit, N.J., assignor to General Motors Corporation, Detroit, Mich., a corporation of Delaware
Filed Oct. 12, 1962, Ser. No. 230,231
7 Claims. (Cl. 308—212)

This invention relates to a cage for spacing the rolling elements in an antifriction bearing and particularly to an improved, light-weight cage for retaining and guiding rollers in a roller bearing.

In prior roller bearings, and particularly in heavy duty roller bearings, as used on locomotives or traction motors and on railway cars, it has been common practice to provide an annular cage having circumferentially spaced roller guiding pockets into which the rollers must be individually inserted during bearing assembly. These cages have previously been of heavy rugged construction wherein the cage walls which guided the rollers restricted distribution of lubricant to the rollers. Furthermore, these prior cages usually had to be in plain bearing supported engagement on one of the race rings thereby increasing the inherent friction within the bearings and materially hindering the flow of lubricant within the bearings. Additionally, these prior heavy cage constructions made assembly of the bearings difficult and slow. Also these prior cage constructions frequently caused detrimental heating of the bearing which shortened bearing life.

It is, therefore, an object of this invention to provide for an antifriction bearing an improved cage of light weight rugged construction which retains the rolling elements in unit-handling relation therewith and which facilitates the distribution of lubricant throughout the bearing.

It is another object of this invention to provide an improved cage for a roller bearing wherein the rollers may be demountably snapped into and out of assembled relation with the cage.

Another object of this invention resides in an improved cage structure wherein circumferentially spaced rollers demountably received in the cage support the cage in spaced relation to the bearing race rings.

To these ends and also to improve generally upon devices of this character, the invention consists in the various matters hereinafter described and claimed. In its broader aspects, the invention is not necessarily limited to the specific structure selected for illustrative purposes in the accompanying drawings wherein FIGURE 1 is a fragmentary end view of an antifriction bearing showing my improved cage with several of the rolling elements in operative positions.

FIGURE 2 is a cross section through the cage taken along the line 2—2 of FIGURE 1 and showing one of the rollers in its pocket.

FIGURE 3 is a cross section through the cage taken along the lines 3—3 of FIGURE 1.

A pair of relatively rotatable race rings, as the inner and outer race rings 10 and 12, are located in coaxial antifrictional relation through an intervening set of rollers 14 which rollingly engage coaxially disposed annular inner and outer raceways 16 and 18. These rollers are circumferentially spaced and guided by my improved cage 20 which is supported by the rollers in radially spaced relation to the raceways 16 and 18. In the illustrated disclosure, the rollers are cylindrical with flat parallel ends perpendicular to their axes of rotation, and the raceway surfaces engaged by the rollers are cylindrical. However, if desired, the rollers and raceways may be generally frusto-conical. One of the race rings, as the outer race ring 12, may be provided at each side of its raceway with an annular shoulder as 22 that extends radially towards the other race ring. The axial spacing between these shoulders 22 slightly exceeds the length of the rollers and axially positions the rollers with respect to the bearing. Additionally, if desired, the other race ring, as the inner race ring, may be provided with a radially disposed annular shoulder 24 arranged to engage the rollers at one end.

My improved cage preferably comprises a single piece annular member 20 which may be cast or otherwise formed from a suitable metal as bronze or other material which has a low coefficient of friction in engagement with the rollers in the presence of lubricant. The cage has a pair of similar axially spaced end rings 28 between which extend a series of circumferentially spaced cross bars 30. Each pair of adjacent cross bars and the end rings 28 provide a generally rectangular pocket 34 for loosely receiving and guiding one of the rollers 14. The cross bars 30 are each generally wedge-shaped in cross section with a pair of flat side faces 36 which converge towards each other radially inwardly of the cage as illustrated in FIGURE 1. The opposing side faces 36 in each pocket are preferably parallel to a radial plane of the cage extending through a mid portion of the pocket, and these opposing side faces are spaced apart through a distance which slightly exceeds the diameter of the roller 14 in that pocket. The radially outer and larger end of each cross bar has a pair of longitudinal projections 38 laterally extending away from each other circumferentially of the cage and respectively into adjacent pockets. These projections terminate at their radially outer ends in generally arcuate circumferentially spaced cross bar end faces 40 which are correspondingly radially spaced from the axis of cage rotation. If desired, the end faces 40 may be substantially flat.

The projections 38 on each cross bar have a pair of circumferentially spaced sloping faces 44 which diverge radially outwardly from the adjacent side faces 36 of the cross bar. The opposed sloping faces 44 in each pocket tangentially and antifrictionally engage the intervening pocketed roller 14 radially outwardly of the pitch circle of the roller axes thus cooperatively supporting the cage in spaced relation between both race rings 10 and 12. The opposed sloping faces 44 of each pocket may be generally flat as illustrated or, if desired, may be arcuate in conforming contour to the adjacent roller periphery. Also, as shown in FIGURE 3, the ends of the projections 38 preferably terminate in spaced relation to the end rings 28 to facilitate the flow of lubricant through the bearing.

Each end ring intermediate its radial width has an annularly disposed flange or shoulder 46 extending axially inwardly towards the rollers and terminating in a flat roller locating face 48. These annular flanges are located radially inwardly of the line of pitch circles of roller axes and the spacing between these opposed flat parallel faces 48 slightly exceeds the roller lengths. Hence, the spaced flat faces 48 cooperate in axially positioning the rollers and permit free rotation of the rollers during bearing operation. The radially inner ends of the cross bars 30 terminate adjacent the radially outer portions of the shoulders 46 and the inner sides of each of the end rings 28 have annularly extending recesses 50 and spaced arcuate recesses 52 respectively located at each side of the flanges 46 to provide for free flow of lubricant around the rollers and through the bearing. Additionally, a series of circumferentially spaced slightly resilient lugs or shoulders 54 extend radially inwardly from the cage end rings and project laterally in opposing relation towards each other at the base of each of the pockets 34 in respective radial alignment with the cross bars. The inner ends of each of these opposing lugs 54 are spaced apart a distance less than the length of a roller in the pocket.

Each lug 54 has an arcuate length such that the spacing between adjacent lugs circumferentially of the cage is less than a roller diameter. Hence, each roller may be snapped past these lugs into a cage pocket 34 for demountable retainment in the cage pocket. Thus it will be appreciated that the four lugs 54 adjacent the inner end of each pocket 34 cooperate with the two opposing projections 38 at the outer end of this pocket to demountably secure the rollers and cage in assembled unit-handling relation. The arcuate spacing between the adjacent lugs 54 is such that after assembly of the rollers in unit-handling relation with the cage, the rollers may be moved radially inwardly within each of their respective pockets through a sufficient extent to pass over the annular shoulders 22 at the ends of the outer race ring thus providing for assembly of the rollers and cage within the outer race ring after which the inner race ring may be slid within the rollers.

In previous heavy duty roller bearings, many difficulties in lubrication have been encountered due to the confining walls of the roller pockets about the rollers. The improved construction of my cage provides for a free flow of lubricant about the rollers and between the rollers and cage at all times during bearing operation since the roller contacts with the cage occur only between the roller peripheries and the bearing surfaces 44 and between the roller ends and the relatively narrow arcuate portions of the shoulder 46. Additionally, the cage end rings 28 are generally arcuately cut away at 56 between adjacent cross bars 30 to expose a considerable portion of the flat roller ends to lubrication while the rollers are still axially guided by the annular shoulders 48. The spacing between the ends of the rollers and the recesses 50 together with the cut-away portions 56 and the spacing between the roller peripheries and the side cross bar faces 36 all cooperate in providing for flow of lubricant about the roller thus providing ample bearing lubrication and preventing the pocketing or trapping of dirt and other deleterious materials which have often caused damage in prior bearing constructions.

I claim:

1. In an antifriction bearing having a pair of race rings respectively provided with annular raceways, a plurality of circumferentially disposed rolling elements engaging the raceways, an annular cage between the race rings and guiding the rolling elements, spaced end rings on the cage, circumferentially spaced cross bars extending between the end rings and providing therewith rolling element-receiving pockets, cross bar projections in bearing engagement with the rolling elements to support the cage in spaced relation to the raceways, and circumferentially spaced lugs projecting axially inwardly from each end ring and cooperating with said projections for demountably retaining the rolling elements in assembled relation with the cage.

2. In an antifriction bearing having a pair of race rings provided with coaxial annular raceways, circumferentially spaced rollers engagable with said raceways, an annular cage between the race rings, end rings on the cage, circumferentially spaced cross bars extending between the end rings and forming therewith roller-receiving pockets, lateral projections extending from each cross bar into roller-riding engagement, said projections spacing the rollers from cross bar engagement and supporting the cage in radially spaced relation to both raceways, and circumferentially spaced lugs projecting inwardly from the end rings and cooperating with said projections to demountably retain the rollers in the pockets in unit-handling relation with said cage.

3. In an antifriction bearing having a pair of race rings provided with opposed coaxial annular raceways, a plurality of circumferentially disposed rollers engaging said raceways, an annular cage between the race rings, end rings on the cage, circumferentially spaced cross bars connected at their ends to the end rings and forming therewith roller-receiving pockets, lateral projections extending from the radial outer ends of the cross bars into tangential roller-supported engagement to position the cage radially spaced from both raceways, said projections spacing the rollers out of engagement with said cross bars, and inwardly extending circumferentially spaced lugs on the end rings demountably retaining the rollers individually in said pockets.

4. In an antifriction bearing having a pair of race rings provided with opposed annular raceways, a plurality of circumferentially disposed rollers engaging said raceways, an annular cage between the race rings, end rings on the cage, circumferentially spaced cross bars connected at their ends to the end rings and forming therewith roller-receiving pockets, lateral projections extending circumferentially of said cage from the radial outer end of each cross bar, said projections having outer ends spaced from said end rings and having bearing surfaces engaging the rollers and locating the cage in spaced relation to both race rings, said projections positioning the rollers in spaced relation to said cross bars, and circumferentially spaced lugs extending axially inwardly from the end rings, said lugs and said projections demountably retaining the rollers in said pockets in unit-handling relation with the cage.

5. In an antifriction bearing having a pair of race rings provided with coaxial annular raceways, circumferentially spaced rollers engageable with said raceways, an annular cage between the race rings, end rings on the cage, circumferentially spaced cross bars extending between the end rings and providing therewith roller-receiving pockets, projections on each cross bar laterally extending into plain bearing roller engagement to support the cage radially spaced from both race rings, an annularly extending shoulder on each end ring engageable with and axially positioning the rollers, the end rings having circumferentially spaced arcuate cut-away portions respectively extending across said pockets between said projections at the ends of each pocket to expose the roller ends to bearing lubricant and circumferentially spaced lugs projecting axially inwardly of the cage from the radial inner portions of said end rings and cooperating with said cross bar projections to demountably hold the rollers in unit-handling relation with the cage.

6. In an antifriction bearing having a pair of race rings provided with coaxial annular raceways, circumferentially spaced rollers engageable with said raceways, an annular cage between the race rings, end rings on the cage, circumferentially spaced cross bars extending between the end rings and providing therwith pockets respectively receiving said rollers, lateral projections extending from the radial outer end of each cross bar into bearing engagement with an adjacent roller to support the cage in radially spaced relation to both raceways, the end rings having annular shoulder portions providing roller-engaging faces to axially position the pocketed rollers, said end rings being generally arcuately cut away at their peripheries between adjacent cross bars to expose end portions of each roller, and inwardly extending projections on the end rings demountably retaining the rollers in snap-insertion within said pockets.

7. In an antifriction bearing having a pair of race rings provided with annular raceways, circumferentially spaced rollers engageable with said raceways, an annular cage between the race rings, axially spaced end rings on the cage, circumferentially spaced cross bars extending between and integral with the end rings, said cross bars providing with the end rings spaced pockets respectively receiving said rollers, projections on each cross bar laterally extending into a pocket in plain bearing roller engagement to support the cage in radially spaced relation to both raceways, an annular extending shoulder on each end ring laterally extending into end roller locating engagement, each end ring having cut-away portions between adjacent cross bars to expose the pocket roller ends to bearing lubricant, and circumferentially spaced inwardly projecting shoulders on the end rings, each of said last mentioned shoulders being spaced apart a distance less than a roller diameter and permitting the rollers to be respectively snapped into and out of unit-handling relation within the said pockets.

References Cited by the Examiner

UNITED STATES PATENTS

| | | | |
|---|---|---|---|
| 2,382,975 | 8/45 | Coddington | 308—201 |
| 2,946,633 | 7/60 | Gothberg | 308—217 |

FOREIGN PATENTS

| | | |
|---|---|---|
| 224,518 | 10/59 | Australia. |
| 1,135,911 | 12/56 | France. |
| 1,168,435 | 9/58 | France. |
| 1,008,965 | 5/57 | Germany. |
| 1,099,809 | 2/61 | Germany. |

ROBERT C. RIORDON, *Primary Examiner.*

FRANK R. SUSKO, *Examiner.*